US008867608B2

(12) United States Patent
Nitzan

(10) Patent No.: US 8,867,608 B2
(45) Date of Patent: Oct. 21, 2014

(54) SYSTEMS AND METHODS FOR SEGMENTING AND COMMUNICATING VIDEO DATA

(75) Inventor: Raz Moshe Nitzan, Sunnyvale, CA (US)

(73) Assignee: Harmonic, Inc., San Jose, CA (US)

( * ) Notice: Subject to any disclaimer, the term of this patent is extended or adjusted under 35 U.S.C. 154(b) by 682 days.

(21) Appl. No.: 13/016,812

(22) Filed: Jan. 28, 2011

(65) Prior Publication Data

US 2012/0195361 A1    Aug. 2, 2012

(51) Int. Cl.
*H04N 7/12* (2006.01)
*H04N 11/02* (2006.01)
*H04N 11/04* (2006.01)
*H04J 1/00* (2006.01)
*H04K 1/00* (2006.01)
*H04N 7/173* (2011.01)
*H04N 21/2347* (2011.01)
*H04N 21/236* (2011.01)
*H04N 21/845* (2011.01)
*H04N 21/6336* (2011.01)

(52) U.S. Cl.
CPC ..... *H04N 21/2347* (2013.01); *H04N 21/23614* (2013.01); *H04N 21/8456* (2013.01); *H04N 21/6336* (2013.01)
USPC ......... 375/240.01; 370/485; 380/255; 725/90

(58) Field of Classification Search
CPC .......... H04N 21/2347; H04N 21/8456; H04N 21/6336; H04N 21/23614
USPC ..................................................... 375/240.01
See application file for complete search history.

(56) References Cited

U.S. PATENT DOCUMENTS

| | | | |
|---|---|---|---|
| 2004/0006575 A1* | 1/2004 | Visharam et al. | 707/104.1 |
| 2005/0190794 A1* | 9/2005 | Krause et al. | 370/485 |
| 2005/0203927 A1* | 9/2005 | Sull et al. | 707/100 |
| 2005/0262539 A1* | 11/2005 | Barton et al. | 725/90 |
| 2009/0028331 A1* | 1/2009 | Millar et al. | 380/255 |

* cited by examiner

*Primary Examiner* — Hee-Yong Kim
(74) *Attorney, Agent, or Firm* — Brokaw Patent Law PC; Christopher J. Brokaw

(57) ABSTRACT

A data processing system receives video data from a data source and separates the video data into multiple video data segments. Each of the multiple video data segments are substantially the same size. The system generates a data segmentation element associated with each video data segment. The data segmentation element describes content in the associated video data segment. Each video data segment and the associated data segmentation element are communicated to a destination device.

21 Claims, 7 Drawing Sheets

SYSTEMS AND METHODS FOR SEGMENTING AND COMMUNICATING VIDEO DATA

BACKGROUND

Various data communication systems and networks are used to distribute content to users. These communication systems and networks typically include multiple systems, networks, and other communication-related devices. The distributed content includes video data, audio data and various other types of data communicated to one or more destination devices.

Certain types of content, such as video content, is distributed in an encrypted format. In many situations, the communication devices handling the distribution of the encrypted data have limited computing resources and limited memory. These devices may not be capable of decrypting and process the data they are handling. For example, a communication device that is forwarding or routing encrypted data across a network may be incapable of decrypting parsing and processing the data. In this situation, it is desirable to provide a data communication system and method that allows encrypted data to be communicated to and processed by one or more destination devices without requiring the destination device or intermediate devices to parse and decrypt the data. Even if a particular device is capable of decrypting the data being handled, the decryption and the video parsing process typically requires significant computational resources. Such decryption and video parsing processing may degrade the overall performance of the data communication system.

BRIEF DESCRIPTION OF THE DRAWINGS

Throughout the description, similar reference numbers may be used to identify similar elements.

DETAILED DESCRIPTION

The systems and methods described herein relate to the processing and communication of video data to one or more destination devices. In particular, the data processing includes segmenting received video data, such as MPEG data, into multiple segments and inserting segmentation data elements that identify segmentation points and other data associated with the segments. In particular implementations, the multiple segments have a uniform size and contain encrypted data. This pre-processing before communicating the multiple segments to the end devices reduces the processing required by the end devices to identify the proper segments within the stream.

Particular examples discussed herein refer to the use of MPEG data formats for encoding and decoding data segments. The described systems and methods can operate with any type of MPEG data, such as MPEG-2 and MPEG-4. Additionally, data encoded using the H.264 video format can be processed using the systems and methods described herein. In other embodiments, the described systems and methods can use any data communication protocol and any encoding/decoding processes when handling the data segments discussed herein. Additionally, certain examples discussed herein are related to video data. However, the described systems and methods are applicable to any type of data having any data format.

The described systems and methods perform data segmentation. For example, a particular device can segment video data for http streaming using a process that includes analysis of the video data and identification of the appropriate segmentation points, such as the start of video frames. This analysis requires significant computational resources and is not possible when dealing with encrypted video data. The systems and methods described herein leverage the knowledge that an MPEG TS (transport stream) header is not encrypted according to the MPEG standard. Since the MPEG TS header is not encrypted, various data segmentation points are stored it this header such that other devices can identify the data segmentation points without having to decrypt or extensively analyze the data. These other devices can identify the data segmentation points, such as the start of a frame, and segment the video data correctly even if the payload data is encrypted. The MPEG specification does not provide for including data segmentation points in the MPEG TS header. However, as discussed herein, a specific PID (Packet ID) is inserted into the MPEG TS header to identify the data segmentation points while still complying with the MPEG specification.

Figure 1:
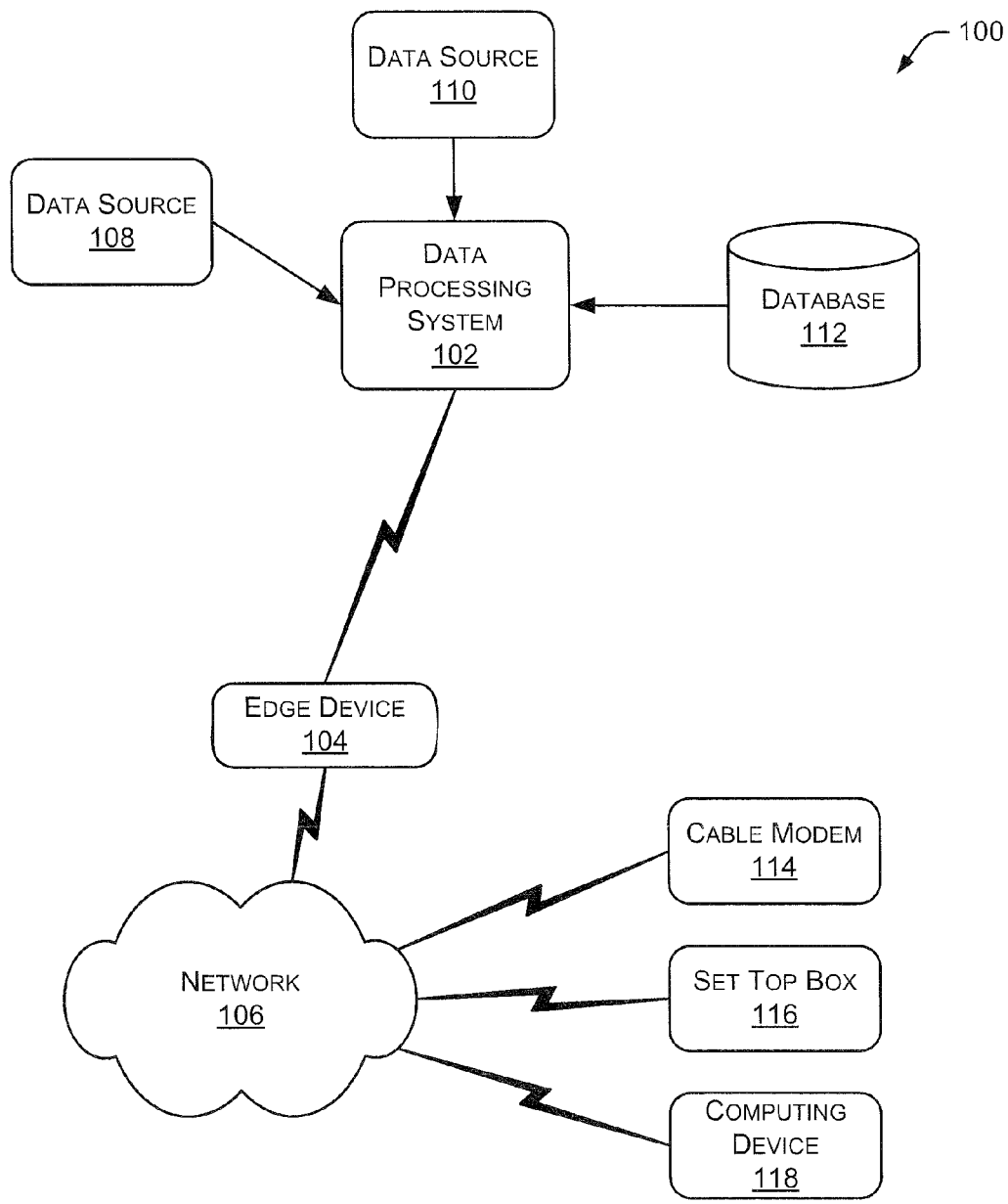
FIG. 1 illustrates an example environment capable of implementing the video data segmenting and data communication systems and methods described herein.

FIG. 1 illustrates an example environment 100 capable of implementing the video data segmenting and data communication systems and methods described herein. Environment 100 includes a data processing system 102 coupled to a data communication network 106 through an edge device 104. Data processing system 102 performs various data segmenting and data communication functions as described herein. In a particular implementation, data processing system 102 is part of a "head end" of a content distribution system, such as a cable or satellite distribution system.

Data communication network 106 represents any type of data network, such as a local area network (LAN), wide area network (WAN), or the Internet. In particular implementations, data communication network 106 is a combination of multiple networks communicating data using one or more protocols across any communication medium. Data communication network 106 can be a combination of wired and wireless data networks. Edge device 104 provides an entry point into a network backbone or network core. In particular situations, edge device 104 performs translation between different data communication protocols. Example edge devices 104 include routers, switches, integrated access devices, and so forth. Edge device 104 may also be referred to as a "network edge device". Example edge devices include cable modems, servers, and any other device capable of processing video data.

Data processing system 102 is coupled to receive data from data sources 108 and 110, and from a database 112. Data sources 108 and 110 can provide any type of data in any format to data processing system 102. In a particular embodiment, data source 108 and/or 110 provide any type of data in any format to data processing system. For example, data source 108 or 110 can provide video data from a live or recorded event. Database 112 can store any type of data in any format that is accessible to data processing system 102. In particular embodiments, data sources 108, 110 are located remotely from data processing system 102 and coupled to the data processing system using a data communication link or network. Similarly, database 112 may be located remotely from data processing system 102 and coupled via a data communication link or network.

As discussed in greater detail below, data processing system 102 segments data received from data source 108, 110 or database 112 into multiple segments of substantially uniform size. Data processing system 102 also generates segmentation data elements that identify segmentation points and other data associated with the multiple segments. The segmentation data elements assist the end devices in processing the data contained in the multiple segments. Data processing system 102 can perform additional functions, such as encrypting data, generating MPEG (Moving Picture Experts Group) data streams, and the like.

Environment 100 also includes multiple destination devices: a cable modem 114, a set top box 116, and a computing device 118. The destination devices 114-118 are coupled to data communication network 106, thereby allowing the destination devices to receive data from data processing system 102. For example, destination devices 114-118 are capable of receiving multiple data segments and segmentation data elements from data processing system 102, as discussed herein. In particular embodiments, destination devices 114-118 decode the received data elements and process the data, such as communicating the processed data to a display device in the case of video data.

In other embodiments, a destination device, such as cable modem 114, may communicate received data (or decoded/processed data) to another device via a local communication link, such as a wired or wireless communication link. For example, cable modem 114 may communicate decoded video data to a display device via a WiFi communication link.

Computing device 118 shown in FIG. 1 may include a desktop computer, a laptop computer, a handheld computer, a tablet computing device, an the like. Although not shown in FIG. 1, alternate destination devices include a game console, a smart phone, a portable music/video player, and so forth. Although two data sources 108, 110 and one database 112 are shown in FIG. 1, alternate embodiments may include any number of data sources and any number of databases coupled to data processing system 102. Additionally, any number of destination devices 114-118 may be accessible to data processing system 102 through data communication network 106.

Figure 2:
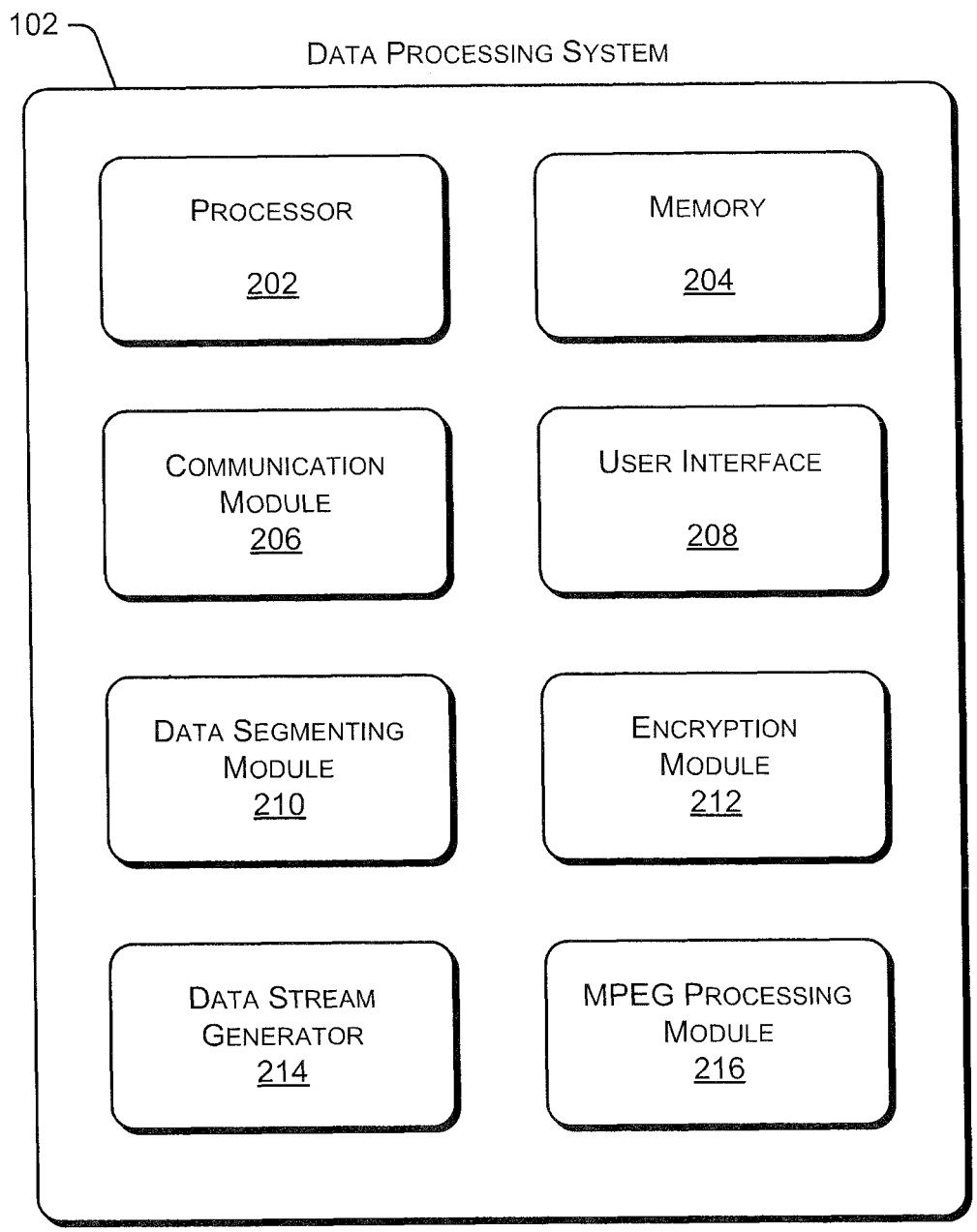
FIG. 2 is a block diagram illustrating example components of a data processing system.

FIG. 2 is a block diagram illustrating example components of data processing system 102, which includes a processor 202 and a memory 204. Processor 202 executes various instructions to implement the functionality provided by data processing system 102, as described herein. Memory 204 stores these instructions as well as other data used by processor 202 and other components contained in data processing system 102. A communication module 206 allows data processing system 102 to communicate with other systems and devices, such as edge devices, data communication networks, destination devices, and so forth.

Data processing system 102 also includes a user interface 208 that allows one or more users, such as system administrators and other operators, to access the data processing system and manage the operation of the system. For example, user interface 208 allows a user to configure (or reconfigure) the data processing system 102 and manage the handling of data received from various data sources and databases.

A data segmenting module 210 in data processing system 102 performs the separation of received data into multiple segments. Data segmenting module 210 also generates data segmentation elements that describe the data contained in the multiple segments. An encryption module 212 encrypts data, such as the multiple data segments, prior to communicating the data segments to one or more destination devices. Encryption module 212 can use any number of encryption algorithms to generate encrypted data segments or other encrypted data.

Data processing system 102 also includes a data stream generator 214 that creates a stream of data segments and associated data segmentation elements describing, for example, the data contained in the multiple data segments. In certain embodiments, data stream generator 214 generates multiple data streams containing the same data segments, but formatted differently to accommodate multiple types of destination devices. An MPEG processing module 216 is capable of receiving and processing (e.g., decoding) data in any number of MPEG formats. Additionally, MPEG processing module 216 can generate MPEG data packets (e.g., encoding) that represent the multiple data segments discussed herein. MPEG processing module 216 also generates MPEG data packets that identify the start and finish of particular data segments for the benefit of the destination devices receiving the MPEG data. MPEG processing module 216 can process any type of MPEG data, such as MPEG-2 and MPEG-4 encoded data.

Figure 3:
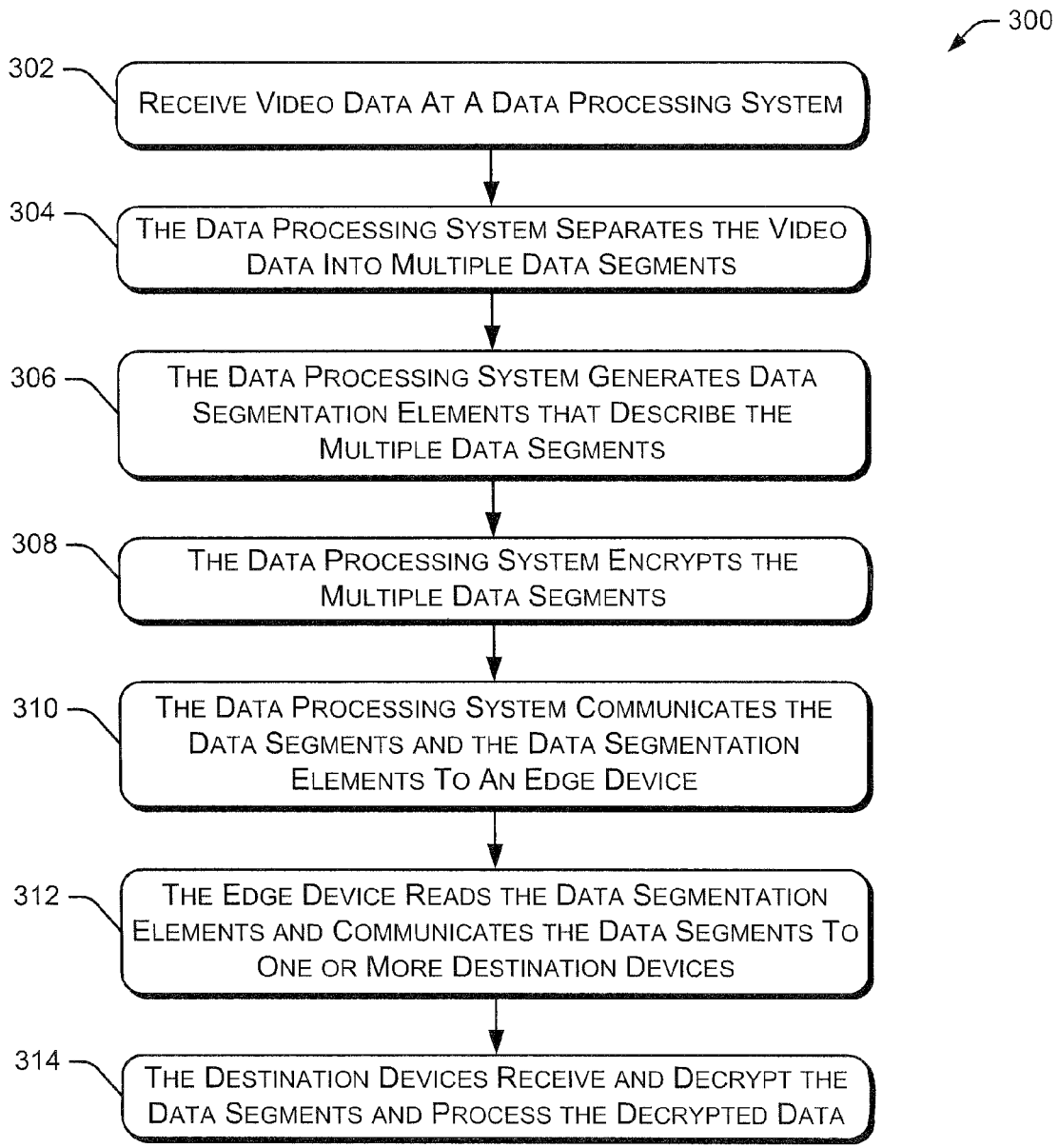
FIG. 3 is a flow diagram illustrating an embodiment of a procedure for segmenting and communicating video data to a destination device.

FIG. 3 is a flow diagram illustrating an embodiment of a procedure 300 for segmenting and communicating video data to a destination device. Initially, a data processing system (e.g., data processing system 102) receives video data from a data source or a database (block 302). The data processing system separates the received video data into multiple data segments (block 304). In a particular embodiment, the multiple data segments are substantially uniform in size. For example, the multiple data segments may have a uniform size based on time (e.g., two seconds of video data) or based on size (e.g., 200 kilobytes of data). In a particular embodiment, video data is segmented at the beginning of a group of pictures (GOP), which is a group of sequential pictures within a video data stream.

The data processing system then generates one or more data segmentation elements associated with the multiple data segments, and describing the multiple data segments (block 306). For example, a data segmentation element can identify the start of a data segment or the end of a data segment. Also, the data segmentation element can contain additional information about one or more data segments, such as the content stored in the data segments, the size of the data segments, or the encoding format of the data. The data segmentation element can be any type of non-encrypted data, such as a data packet, a PID (Packet ID), and the like. In one embodiment, a data segment contains N video GOPs (groups of pictures). In this embodiment, each data segment is typically between one and five seconds in length.

In a particular embodiment, the data processing system encrypts the multiple data segments (block 308). In other embodiments, the received data is already encrypted such that procedure 300 does not need to re-encrypt the data. Although the data segments are encrypted, the data segmentation elements are not encrypted. This allows edge devices and other systems to handle the data segments and associated data segmentation elements without requiring decryption of the data segments. By avoiding the need to decrypt the data segments, the edge devices and other systems can quickly process the data segments and communicate them toward the destination device. The information necessary for the edge device to handle the data segments is contained in the data segmentation elements, thereby eliminating the need for the edge device to read the content of the data segments.

Procedure 300 continues as the data processing system communicates the data segments and the data segmentation elements to an edge device (block 310). The edge device then reads the data segmentation elements and communicates the data segments to one or more destination devices (block 312). As mentioned above, the edge device does not need to read or decode the data contained in the data segments. Instead, the data segmentation elements contain the information necessary to the edge device to process the data segments. Finally, the destination devices receive and decrypt the data segments, and process the decrypted data (block 314). For example, if the data segments contain video data, the destination device decrypts the data segments and communicates the video data to a display device or video rendering system.

Figure 4:
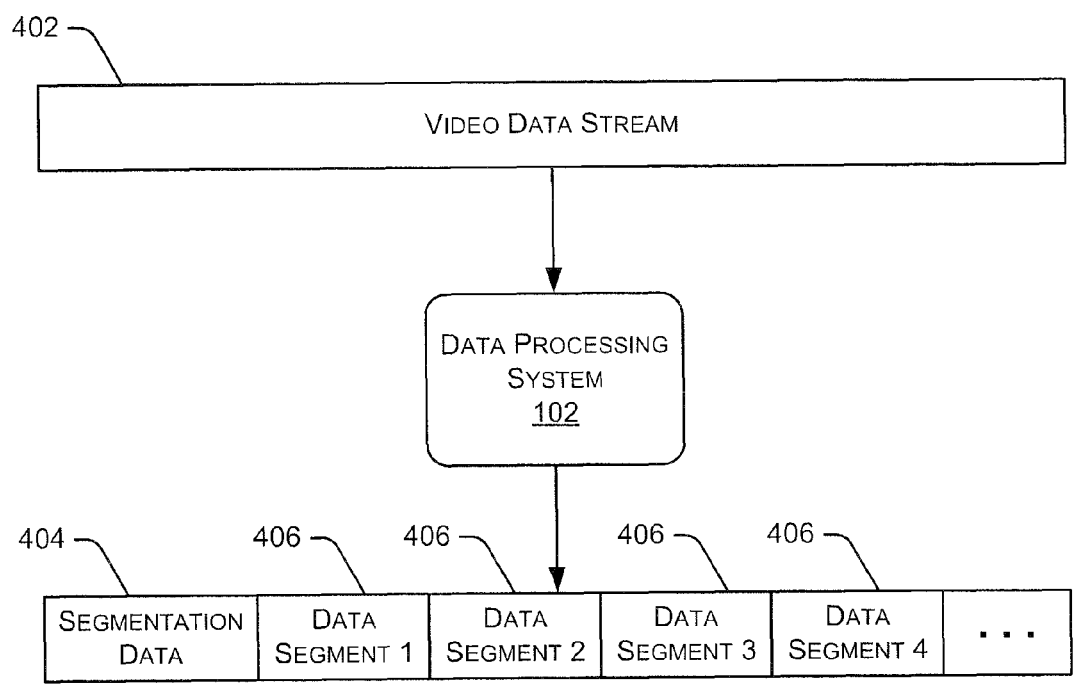
FIG. 4 illustrates an example data stream prior to and after segmenting by a data processing system.

FIG. 4 illustrates an example data stream prior to and after segmenting by a data processing system. Data processing system 102 receives a video data stream 402 from a data source or a database. Video data stream 402 can contain any type of video data in any format, including compressed formats. Video data stream 402 is processed as described herein to generate multiple data segments 406 and an associated data segmentation element 404. As discussed above, data segmentation element 404 contains information related to multiple data segments 406. In a particular embodiment, video data stream 402 is a stream of MPEG video content. In this embodiment, data processing system 102 segments the video data stream into segments that are each approximately two seconds in length. These segments are then distributed to destination devices that can render or otherwise process the video content in the segments.

Figure 5:
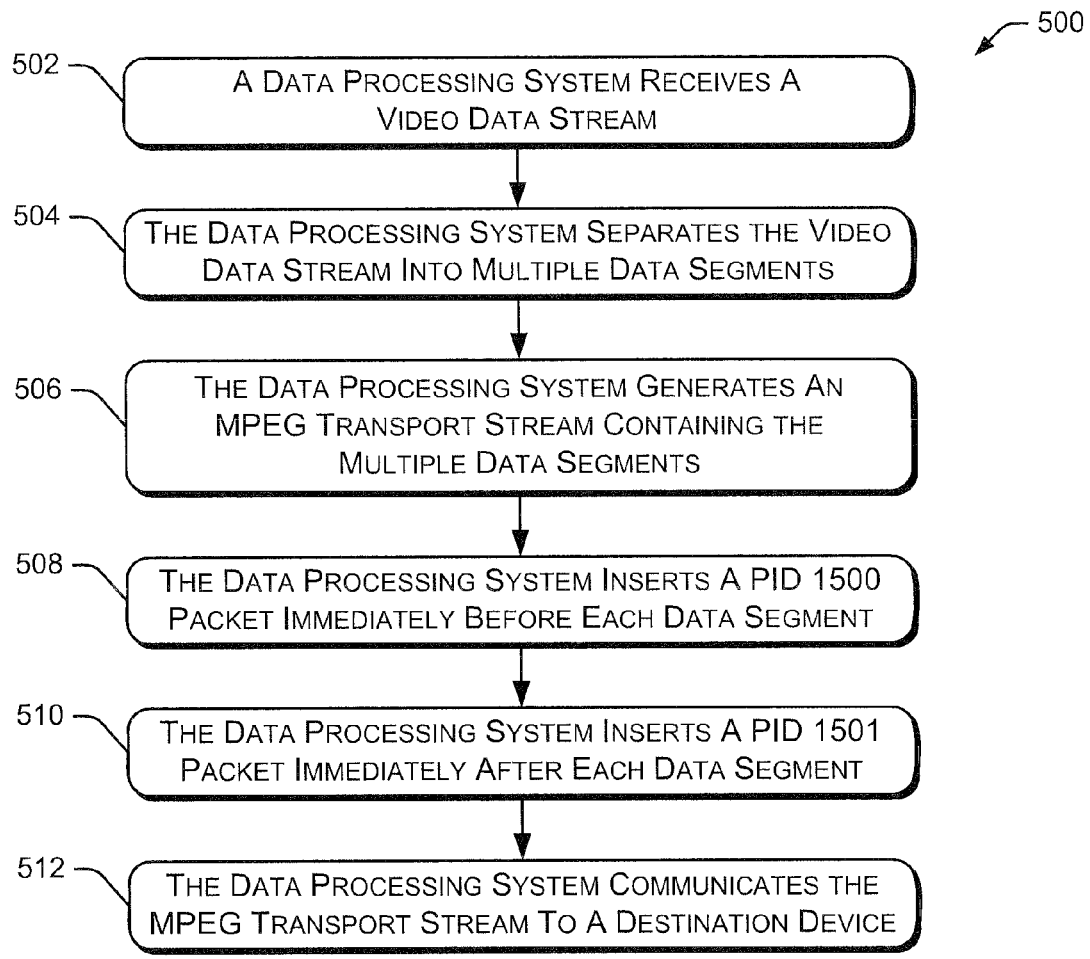
FIG. 5 is a flow diagram illustrating an embodiment of a procedure for segmenting video data into a plurality of data segments and generating an MPEG transport stream containing the data segments.

FIG. 5 is a flow diagram illustrating an embodiment of a procedure 500 for segmenting video data into a plurality of data segments and generating an MPEG transport stream containing the data segments. Initially, a data processing system receives a video data stream from a data source or a database (block 502). The data processing system separates the video data stream into multiple data segments (block 504). In a particular embodiment, the multiple data segments have a substantially uniform size. Typically, the data associated with a particular data segment is stored in multiple packets. In this situation, it is useful to identify the specific packets associated with a particular data segment.

Procedure 500 continues as the data processing system generates an MPEG transport stream containing the multiple data segments (block 506). The MPEG transport stream includes data packets containing portions of the received video data stream. The MPEG transport stream also includes additional data packets with unique PIDs that identify the start of a data segment and the end of a data segment. For example, the data processing system inserts a PID 1500 packet immediately before the first data packet of each data segment (block 508). Additionally, the data processing system inserts a PID 1501 packet immediately after the last data packet of each data segment (block 510). Thus, the PID 1500 and PID 1501 packets define the data packets associated with a particular data segment. Finally, the data processing system communicates the MPEG transport stream to a destination device (block 512).

Figure 6:
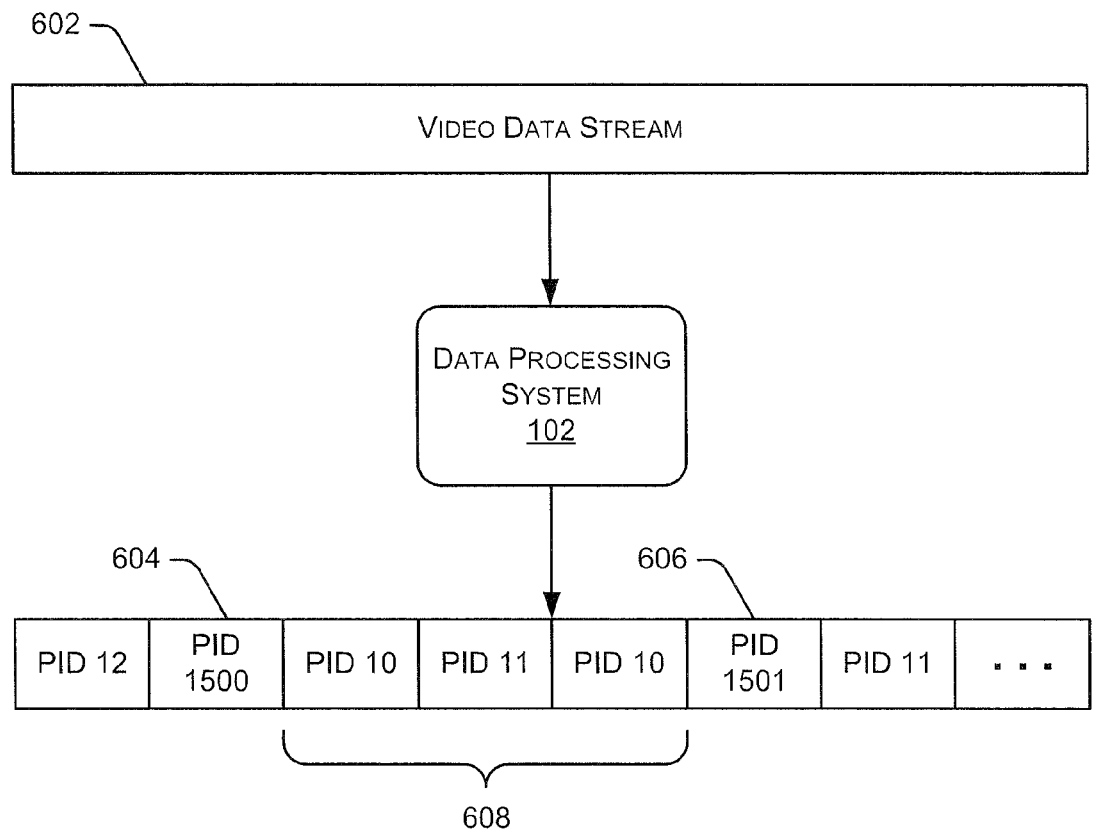
FIG. 6 illustrates an example data stream prior to segmenting by a data processing system, and a resulting MPEG transport stream.

FIG. 6 illustrates an example data stream prior to segmenting by a data processing system, and a resulting MPEG transport stream. Data processing system 102 receives a video data stream 602 from a data source or a database. Video data stream 602 may contain any type of video data in any format. Video data stream 602 is processed as described herein to generate multiple data segments 608, defined by PID 1500 packet 604 at the beginning of the multiple segments and by PID 1501 packet 606 at the end of the multiple segments. As shown in FIG. 6, a particular data segment 608 includes three data packets, shown having PIDs of 10, 11, and 10. In a particular example, when an edge device, destination device, or other device handling the MPEG transport stream identifies a packet with PID 1500, it pushes the packet into a new file and continues adding packets to the file until a packet with PID 1501 is identified. At that time, the file is closed and the device waits for the start of the next segment, identified by another packet with PID 1500.

Figure 7:
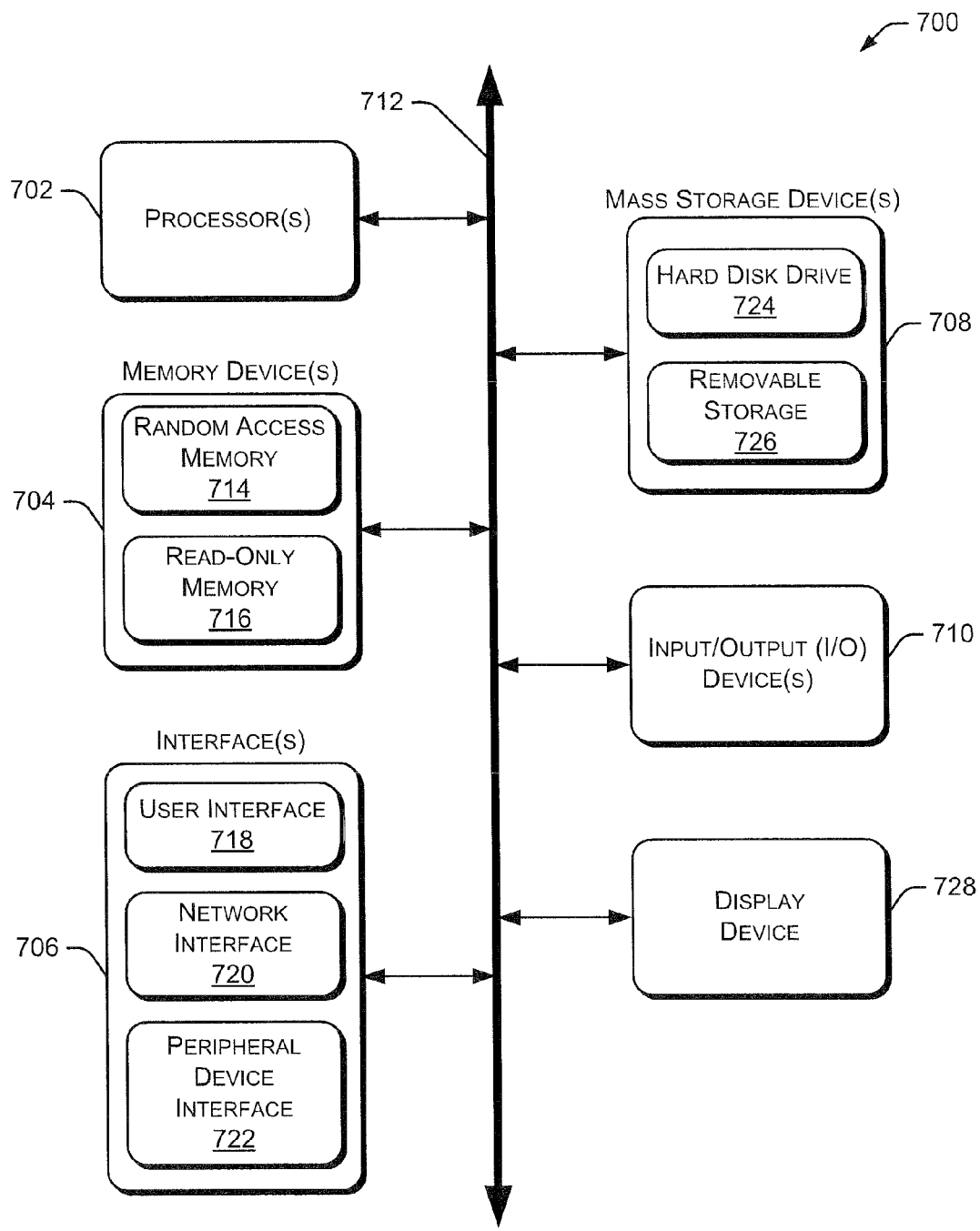
FIG. 7 is a block diagram illustrating an example computing device.

FIG. 7 is a block diagram illustrating an example computing device 700. Computing device 700 may be used to perform various procedures, such as those discussed herein. Computing device 700 can function as a server, a client, or any other computing entity. Computing device 700 can be any of a wide variety of computing devices, such as a desktop computer, a notebook computer, a server computer, a handheld computer, and the like.

Computing device 700 includes one or more processor(s) 702, one or more memory device(s) 704, one or more interface(s) 706, one or more mass storage device(s) 708, one or more Input/Output (I/O) device(s) 710, and a display device 728 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM)) 714 and/or nonvolatile memory (e.g., read-only memory (ROM)) 716. Memory device(s) 704 may also include rewritable ROM, such as Flash memory.

Mass storage device(s) 708 include various computer readable media, such as magnetic tapes, magnetic disks, optical disks, solid state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 728 includes any type of device capable of displaying information to one or more users of computing device 700. Examples of display device 728 include a monitor, display terminal, video projection device, and the like. Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interfaces include a user interface 718 and a peripheral device interface 722.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

As discussed herein, the invention may involve a number of functions to be performed by a computer processor, such as a microprocessor. The microprocessor may be a specialized or dedicated microprocessor that is configured to perform particular tasks according to the invention, by executing machine-readable software code that defines the particular tasks embodied by the invention. The microprocessor may also be configured to operate and communicate with other devices such as direct memory access modules, memory storage devices, Internet-related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention.

Within the different types of devices, such as laptop or desktop computers, hand held devices with processors or processing logic, and also possibly computer servers or other devices that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to the invention when executed by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to the invention as described herein enable the physical transformation of these memory devices. Accordingly, the invention as described herein is directed to novel and useful systems and methods that, in one or more embodiments, are able to transform the memory device into a different state. The invention is not limited to any particular type of memory device, or any commonly used protocol for storing and retrieving information to and from these memory devices, respectively.

Embodiments of the systems and methods described herein facilitate the processing and communication of data. Additionally, some embodiments may be used in conjunction with one or more conventional data processing systems and methods. For example, one embodiment may be used as an improvement of existing data processing systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A computer-implemented method comprising:
receiving MPEG encoded video data from a data source;
separating the MPEG encoded video data into a plurality of data segments, wherein each of the plurality of data segments is a number of consecutive encrypted data packets, and wherein each of the plurality of data segments are substantially the same size;
generating a first data segmentation element for each data segment, wherein the first data segmentation element identifies a start of the associated data segment;
generating a second data segmentation element for each data segment, wherein the second data segmentation element identifies an end of the associated data segment; and
communicating, in a stream, each data segment and the associated first and second data segmentation elements to a destination device,
wherein the first data segmentation element is a packet that immediately precedes the associated data segment in the stream, and
wherein the second data segmentation element is a packet that immediately follows the associated data segment in the stream.

2. The computer-implemented method of claim 1, further comprising generating an MPEG transport stream containing the data segments in an encrypted portion of the MPEG transport stream and containing the data segmentation elements in an unencrypted portion of the MPEG transport stream.

3. The computer-implemented method of claim 1, wherein the first data segmentation element is an MPEG data packet having a PID of 1500.

4. The computer-implemented method of claim 1, wherein the second data segmentation element is an MPEG data packet having a PID of 1501.

5. The computer-implemented method of claim 1, wherein the first data segmentation element further identifies a size of the associated data segment.

6. The computer-implemented method of claim 1, wherein the first data segmentation element further identifies an encoding format associated with the data segment.

7. The computer-implemented method of claim 1, wherein each data segment contains a predetermined amount of video content.

8. A non-transitory computer-readable storage medium storing one or more sequences of instructions, which when executed by one or more processors, cause:
   receiving MPEG encoded video data from a data source;
   separating the MPEG encoded video data into a plurality of data segments, wherein each of the plurality of data segments is a number of consecutive encrypyed data packets, and wherein the plurality of data segments are substantially the same size;
   generating a first data segmentation element for each data segment, wherein the first data segmentation element identifies a start of the associated data segment;
   generating a second data segmentation element for each data segment, wherein the second data segmentation element identifies an end of the associated data segment; and
   communicating, in a stream, each data segment and the associated first and second data segmentation elements to a destination device,
   wherein the first data segmentation element is a packet that immediately precedes the associated data segment in the stream, and
   wherein the second data segmentation element is a packet that immediately follows the associated data segment in the stream.

9. The non-transitory computer-readable storage medium of claim 8, further comprising generating an MPEG transport stream containing the data segments in an encrypted portion of the MPEG transport stream and containing the data segmentation elements in an unencrypted portion of the MPEG transport stream.

10. The non-transitory computer-readable storage medium of claim 8, wherein the first data segmentation element is an MPEG data packet having a PID of 1500.

11. The non-transitory computer-readable storage medium of claim 8, wherein the second data segmentation element is an MPEG data packet having a PID of 1501.

12. The non-transitory computer-readable storage medium of claim 8, wherein the first data segmentation element further identifies a size of the associated data segment.

13. The non-transitory computer-readable storage medium of claim 8, wherein the first data segmentation element further identifies an encoding format associated with the data segment.

14. The non-transitory computer-readable storage medium of claim 8, wherein each data segment contains a predetermined amount of video content.

15. An apparatus, comprising:
   one or more processors; and
   one or more non-transitory computer-readable storage medium storing one or more sequences of instructions, which when executed by the one or more processors, cause:
   receiving MPEG encoded video data from a data source;
   separating the MPEG encoded video data into a plurality of data segments, wherein each of the plurality of data segments is a number of consecutive encrypted data packets, and wherein the plurality of data segments are substantially the same size;
   generating a first data segmentation element for each data segment, wherein the first data segmentation element identifies a start of the associated data segment;
   generating a second data segmentation element for each data segment, wherein the second data segmentation element identifies an end of the associated data segment; and
   communicating, in a stream, each data segment and the associated first and second data segmentation elements to a destination device,
   wherein the first data segmentation element is a packet that immediately precedes the associated data segment in the stream, and
   wherein the second data segmentation element is a packet that immediately follows the associated data segment in the stream.

16. The apparatus of claim 15, further comprising generating an MPEG transport stream containing the data segments in an encrypted portion of the MPEG transport stream and containing the data segmentation elements in an unencrypted portion of the MPEG transport stream.

17. The apparatus of claim 15, wherein the first data segmentation element is an MPEG data packet having a PID of 1500.

18. The apparatus of claim 15, wherein the second data segmentation element is an MPEG data packet having a PID of 1501.

19. The apparatus of claim 15, wherein the first data segmentation element further identifies a size of the associated data segment.

20. The apparatus of claim 15, wherein the first data segmentation element further identifies an encoding format associated with the data segment.

21. The apparatus of claim 15, wherein each data segment contains a predetermined amount of video content.

* * * * *